United States Patent
Schooley

(10) Patent No.: US 6,293,023 B1
(45) Date of Patent: Sep. 25, 2001

(54) LEVEL

(75) Inventor: Jack M. Schooley, 2014 NE. 155 Ave., Vancouver, WA (US) 98684

(73) Assignees: Jason R. Crowe; Jack M. Schooley, both of Vancouver, WA (US)

( * ) Notice: Subject to any disclaimer, the term of this patent is extended or adjusted under 35 U.S.C. 154(b) by 0 days.

(21) Appl. No.: 09/302,014

(22) Filed: Apr. 29, 1999

(51) Int. Cl.$^7$ .................................................. G01C 9/28
(52) U.S. Cl. ........................... 33/374; 33/376; 33/375; 33/809; 33/451
(58) Field of Search ........................... 33/374, 290, 291, 33/292, 296, 245, 365, 380, 383, 379, 451, 452, 464, 375, 419, 425, 470, 809

(56) References Cited

U.S. PATENT DOCUMENTS

| | | | |
|---|---|---|---|
| 2,419,451 | * | 4/1947 | Keller ...................................... 33/291 |
| 3,243,888 | * | 4/1966 | Redding .................................. 33/290 |
| 3,984,919 | * | 10/1976 | Guisti ..................................... 33/290 |
| 4,067,117 | * | 1/1978 | Bernard ................................... 33/375 |
| 4,130,943 | * | 12/1978 | Talbot ..................................... 33/374 |
| 4,152,838 | * | 5/1979 | Cook ....................................... 33/342 |
| 4,607,437 | * | 8/1986 | McSorley, Sr. et al. ............... 33/374 |
| 4,928,395 | * | 5/1990 | Good ....................................... 33/374 |
| 5,103,569 | * | 4/1992 | Leatherwood ......................... 33/379 |
| 5,249,365 | * | 10/1993 | Santiago ................................. 33/374 |
| 5,412,875 | * | 5/1995 | Hilderbrandt .......................... 33/374 |
| 5,433,011 | * | 7/1995 | Scarborough et al. ................ 33/376 |
| 5,442,864 | * | 8/1995 | Erman .................................... 33/376 |
| 5,577,327 | * | 11/1996 | Archambault .......................... 33/374 |
| 5,617,641 | * | 4/1997 | Aarhus .................................... 33/374 |
| 6,041,510 | * | 3/2000 | Huff ........................................ 33/374 |
| 6,047,478 | * | 4/2000 | Sowers ................................... 33/379 |

\* cited by examiner

*Primary Examiner*—Diego Gutierrez
*Assistant Examiner*—Gail Verbitsky
(74) *Attorney, Agent, or Firm*—Owen W. Dukelow; Kolisch Hartwell et al.

(57) ABSTRACT

A level comprises a frame defining first and second parallel channels and first and second rails fitted slidingly in the first and second channels respectively. The level is adjustable in length by sliding the rails in the respective channels of the frame.

8 Claims, 3 Drawing Sheets

LEVEL

This invention relates to a level.

The conventional carpenter's level, which is used for testing whether a nominally horizontal (or vertical) surface is in fact horizontal (or vertical), within an acceptable tolerance, comprises a frame, typically made of a metal such as aluminum alloy, having at least one flat guide surface and two bubble vials mounted in the frame. The level is positioned with the guide surface against the surface to be tested. One vial is oriented relative to the guide surface for testing a nominally vertical surface and the other is oriented for testing a nominally horizontal surface. The typical level is about 2 feet long, although longer levels, e.g. four feet or six feet long, are also available.

The fact that conventional levels are available only in increments of about 2 feet in length gives rise to difficulty or inconvenience in using the conventional level. Imagine, for example, that you are installing a shelf inside a closet having a back wall about 3'6" wide between two side walls. You wish to attach a support to the back wall for supporting the rear edge of the shelf. The support should be horizontal, and you wish to mark the position of the support at two locations, adjacent the side walls respectively. Obviously, since the back wall is only 3'6" wide, you cannot use a four foot level because there is not sufficient space between the two side walls. If you attempt to use a 2 foot level, you must place the markings in two steps, which is inconvenient and can cause errors.

SUMMARY OF THE INVENTION

In accordance with the invention there is provided a level comprising a frame defining first and second parallel channels, and first and second rails fitted slidingly in the first and second channels respectively, whereby the level is adjustable in length by sliding the rails in the respective channels.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
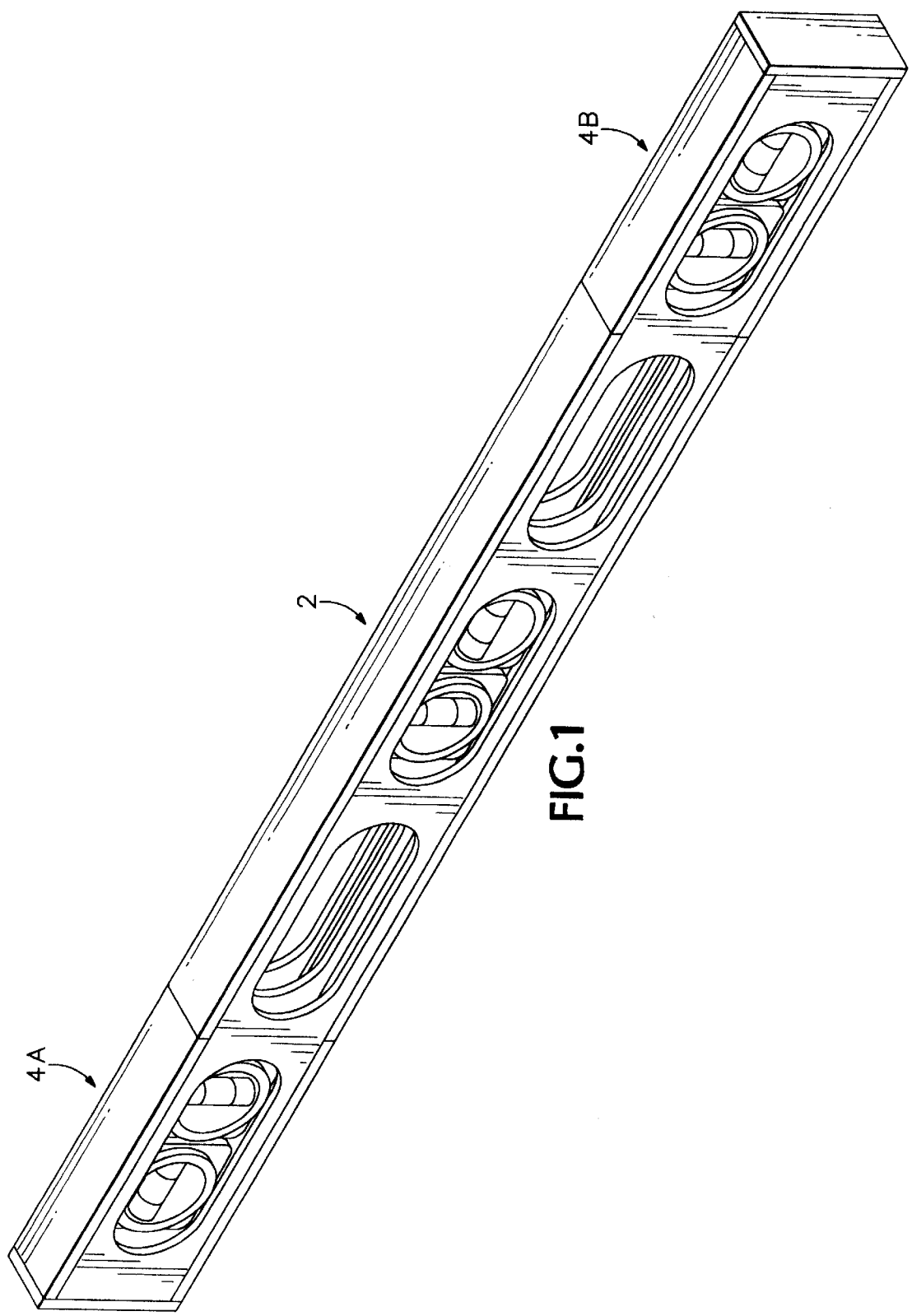
FIG. 1 is a perspective view of a level in accordance with the invention in a retracted condition.

The illustrated level comprises a frame 2 and two rails 4A and 4B. In the following description, the suffix A or B is used when it is necessary or helpful to distinguish between the two rails or elements that are associated with the two rails. Otherwise, no suffix is used.

The frame 2 is made from a length segment of an aluminum alloy extrusion and is generally I-shaped in cross-section, having two spaced parallel guide members 8 connected by a web plate 12 so that two channels 20 are defined on opposite sides respectively of the web plate 12. Each member 8 has at each edge a lip or flange 16 projecting toward the other member 8. The frame has two parallel guide surfaces 24, only one of which can be seen in the drawings.

Each rail 4 includes a slide 28 and a frame extender 32 which is attached to the slide.

The frame extender 32 is made of a length segment of the same extrusion as is used to make the frame 2 and consequently it includes two parallel guide members 36 and a web plate 40. The guide members 36 and the web plate 40 define two channels 42, 44 on opposite sides respectively of the web plate 40. Each guide member 36 has at each edge a lip or flange 52 projecting toward the other guide member 36. The frame extender has two parallel guide surfaces.

Each slide 28 includes a web plate 46 and two flanges 48 which extend perpendicular to the web plate 46. The slide has a rebate 60 at the base of each flange. The cross-sectional configuration of the slide is selected relative to that of the channels of the frame extender so that the slide 28 can be inserted in the channel 42 in only one orientation, and in this orientation the web plate 46 of the slide is held away from the web plate of the frame extender by the flanges 48. The slide 28 is retained in position relative to the frame extender by pins (not shown). The slide does not obstruct the channel 44. Each rail also includes an end cap 50, which is attached to the frame extender and the slide.

Figure 2:
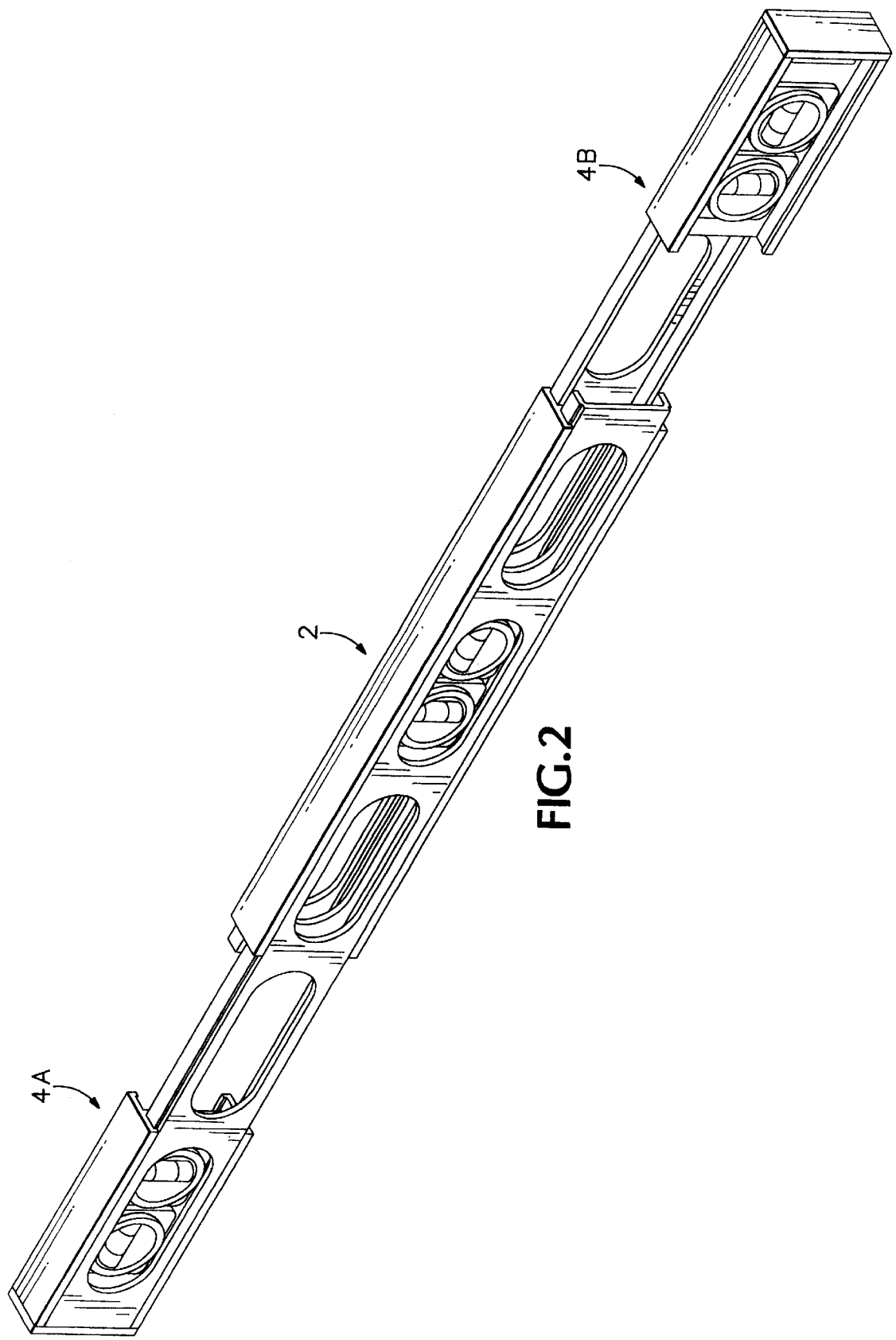
FIG. 2 is a similar view of the level in a partially extended condition.

The cross-sectional configuration of the slide 28 also allows the slide to be inserted in the channel 20 of the frame with the web plate 46 of the slide held away from the web plate 12 of the frame 2 by the flanges 48. The slide constrains the frame extender into alignment with the frame 2, with the two guide surfaces of the frame extender coplanar with the guide surfaces 24 of the frame. The slide 28 is slidable in the channel 20, allowing adjustment in the length of the level between a retracted condition, in which the frame extenders abut the frame 2, as shown in FIG. 1, through a partially extended condition, shown in FIG. 2, to a fully extended condition in which only a relatively short segment of the length of the slide is accommodated in the channel 20.

The length of each slide 28 is approximately equal to the sum of the length of the frame 2 and the lengths of the two frame extenders 32. The slide of the rail 4A then extends through the channel 20A of the frame 2 and into the channel 44 of the rail 4B when the level is in the retracted condition. This allows the maximum difference in length between the retracted condition and the fully extended condition.

Figure 3:
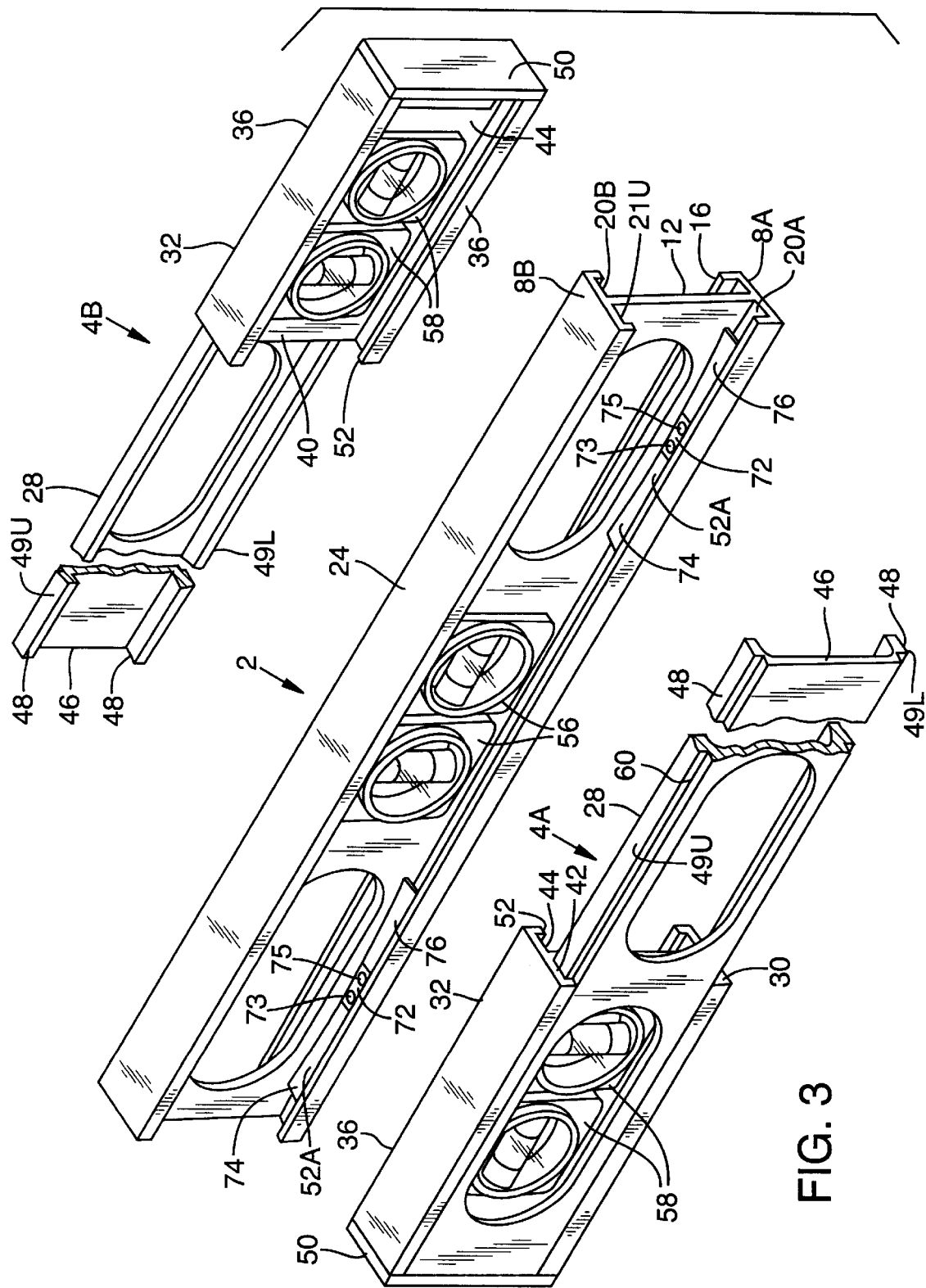
FIG. 3 is a perspective exploded view of the level.

The frame also includes, in each channel 20, a pair of biasing means such as leaf springs 52 (only the leaf springs 52A are shown). The leaf springs 52A are attached to the lower guide member 8A and urge the slide 28A toward the upper guide member 8B. Conversely, the leaf springs in the channel 20B are attached to the upper guide member 8B and urge the slide 28B toward the lower guide member 8A. The leaf springs take up clearance between the slides 28 and the frame 2. As shown in FIG. 3, leaf springs 52 preferably are formed of a single strip and include two wings 74, 76 extending from a central mount 72 in guide member 8A. Central mount 72 may include two rivets 73, 75 for affixing springs 52 in place. Slides 28 include a sliding surface 49L that abuts and slides against leaf spring 52 as the level is moved between the retracted and extended conditions. Slides 28 include a sliding surface 49U that directly contacts and slides against a sliding surface 21U in guide member 8B. Springs 52 urge sliding surfaces 49U of slides 28 and sliding surfaces 21U of guide member 8B together. Springs 52 increase the friction between the sliding surfaces which frictionally holds the level in any relative position between and including the retracted and extended conditions.

The web plate 12 is formed with an aperture in which two indicators such as bubble vials 56 are mounted. One of the vials is oriented for testing a vertical surface and the other is oriented for testing a horizontal surface. The bubble vials 56 project from the web plate 12 into the channels 20 of the frame 2. Since the web plate 46 of the slide 28 is held away from the web plate 12 of the frame 2 by the flanges 48, the web plate 46 remains clear of the bubble vials 56 when the slide is inserted in the channel 20. Similarly, the web plates 40 are each formed with an aperture in which two bubble vials 58 are mounted. The bubble vials 58 project from the web plate 40 into the channels 42, 44 of the frame extender. Since the web plate 46 of the slide 28 is held away from the web plate 40 of the frame extender by the flanges 48, the web plate 46 of the slide 28 remains clear of the bubble vials 58. Moreover, when the level is compressed from its extended condition to its retracted condition, and the slide 28 of one rail enters the channel 44 of the other rail, the web plate 46 remains clear of the bubble vials 58 of the other rail. The bubble vials 58 are thereby protected from damage by impact with the slide.

The web plates 12 and 46 are formed with openings which serve to reduce the weight of the level and facilitate gripping and handling of the level. The openings also provide viewing access to the bubble vials, so that regardless of the degree of extension of the level, the user can see at least one vial oriented for testing a vertical surface and one vial oriented for testing a horizontal surface.

The manner of use of the level, for testing a nominally vertical or nominally horizontal surface, or for marking segments of a horizontal or vertical line on a vertical surface, will be well understood by a person skilled in the art.

In use of the level illustrated in the drawings, for example in a confined space, the user extends the rails from the frame sufficiently to span the desired distance without interference with other structures, and the user can then determine whether a nominally horizontal (or vertical) surface is in fact horizontal (or vertical) or can mark a horizontal (or vertical) line on a vertical surface between two structures that would interfere with a longer level. Further, it is possible to manipulate the level into a confined space in its retracted condition and then extend it for use, e.g. in marking a vertical or horizontal line on a wall.

It will be appreciated by those skilled in the art that under some conditions aluminum does not slide smoothly against aluminum but sticks due to galling. Various treatments are available for relieving galling.

It will be appreciated that the invention is not restricted to the particular embodiment that has been described, and that variations may be made therein without departing from the scope of the invention as defined in the appended claims and equivalents thereof.

What is claimed is:

1. A level comprising:

a frame defining first and second parallel channels, and first and second rails, each rail including a slide fitted slidingly in the first and second channels respectively, and further comprising a first biasing means coupled between the frame and the slide of the first rail, and a second biasing means coupled between the frame and the slide of the second rail, whereby the level is adjustable in length by sliding the slides in the respective channels.

2. A level according to claim 1, wherein the frame is generally I-shaped in cross-section and comprises two spaced guide members and a web plate joining the two guide members, and wherein the first and second channels are at opposite sides respectively of the web plate, and further wherein the biasing means are mounted to one of the two spaced guide members and urge the slides towards the other of the two spaced guide members.

3. A level according to claim 1, wherein the biasing means take up clearance between the slides and the frame.

4. A level according to claim 1, wherein the frame includes a pair of surfaces and each of the slides include a surface, wherein the surfaces of the frame directly contact the slide surfaces and slide against the slide surfaces as the level is adjusted in length, and further wherein the biasing means urge the frame surfaces and slide surfaces together.

5. A level according to claim 4, wherein at least one surface of each mating pair of frame and slide surfaces is treated to prevent sticking.

6. A level according to claim 1, wherein the biasing means are leaf springs.

7. A level according to claim 6, wherein the leaf springs are formed of a single strip and includes two wings and a central mount.

8. A level according to claim 7, wherein the frame includes upper and lower guide members defining the channels, and the leaf springs are mounted in one of the upper and lower guide members and urge the slides towards the other of the upper and lower guide members.

* * * * *